A. LAMBLIN.
MOTOR CAR AND LORRY FRONT.
APPLICATION FILED OCT. 5, 1920.

1,403,967.

Patented Jan. 17, 1922.
3 SHEETS—SHEET 1.

INVENTOR:
Alexandre Lamblin.

By [signature]

his ATTORNEY.

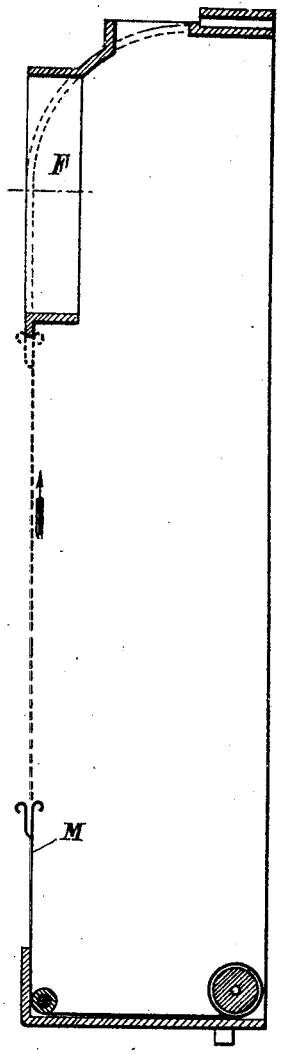

UNITED STATES PATENT OFFICE.

ALEXANDRE LAMBLIN, OF PARIS, FRANCE.

MOTOR CAR AND LORRY FRONT.

1,403,967.     Specification of Letters Patent.    Patented Jan. 17, 1922.

Application filed October 5, 1920. Serial No. 414,886.

*To all whom it may concern:*

Be it known that I, ALEXANDRE LAMBLIN, subject of the King of Belgium, residing at Paris, France, have invented certain new and useful Improvements in Motor Car and Lorry Fronts, of which the following is a specification.

The subject matter of the present invention is a front for a motor car or motor lorry which serves to support and secure the front members of the vehicle, viz., the radiator, headlight, side lamps, starting handle, identification plate, engine bonnet, closure screen, etc.

This contrivance is shown on the accompanying drawing, in which :—

Figure 1:
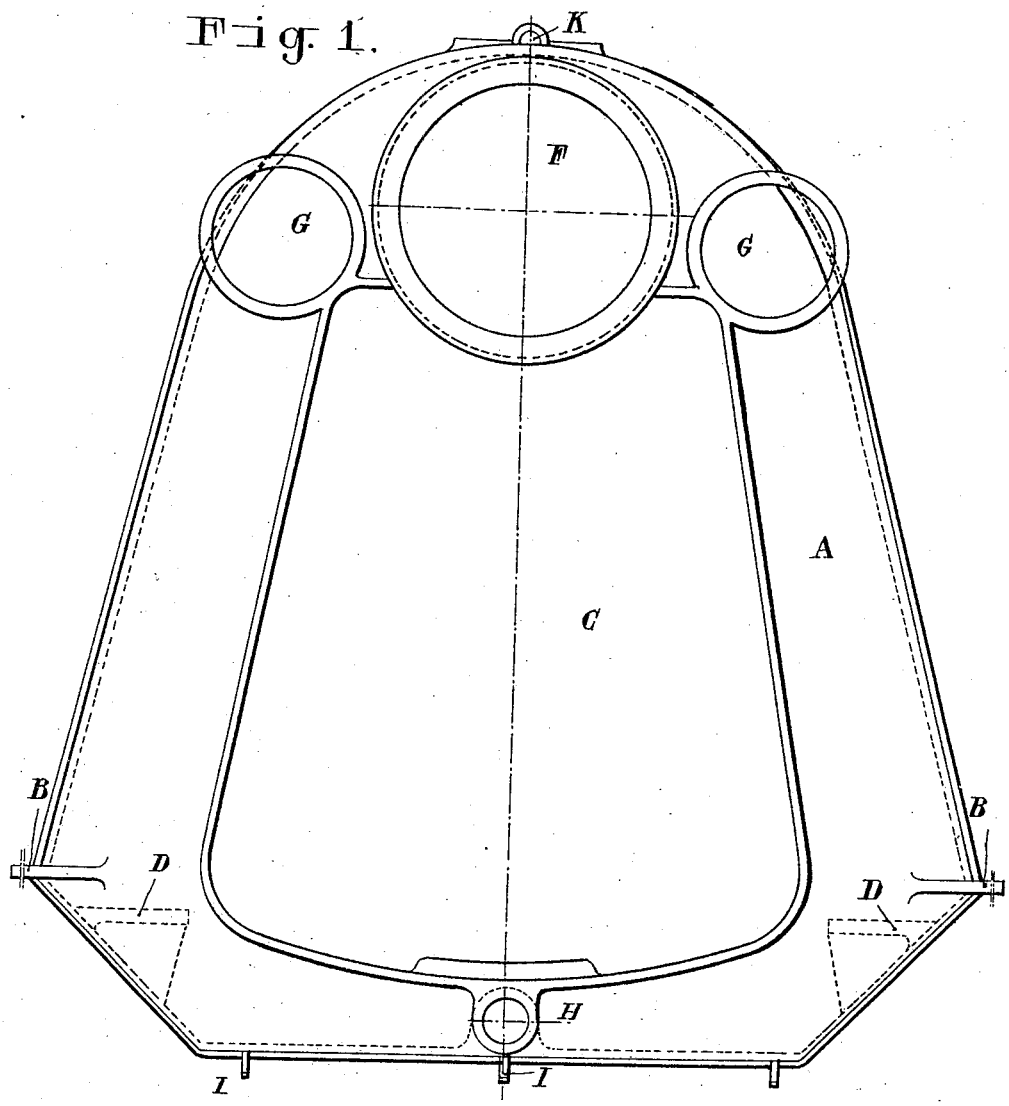
Figure 2:
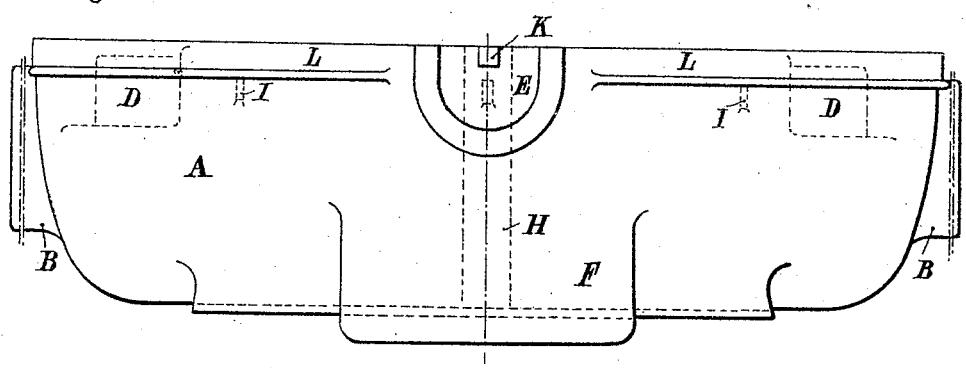

Fig. 1 is a front elevation,
Fig. 2 a plan, and
Fig. 3 a vertical section.

The contrivance consists of a body A, which is secured to the chassis of the vehicle by lugs B.

This body has an opening for the passage of air to the radiator.

The radiator is connected to the body by securing lugs D.

An opening E is provided in the body to enable the radiator cap to be placed in position.

The upper portion of the body A has a circular opening F for the headlight, two circular openings G for the side lamps, and a socket K for mounting the hinge spindle of the bonnet.

The lower portion of the body provides for the starting handle being mounted in the opening H, and it carries the identification plate by the securing lugs I.

The body fits by its shoulder L within the bonnet.

A closure screen M within the body and sliding in front of the radiator, enables the temperature to be regulated by closing more or less such screen, and also enables the air passage to the radiator to be closed air-tight in order to shelter same from cold in winter.

It will be noted from the foregoing description that my improved device is made in one piece, and as a consequence I am enabled to dispense with special headlight brackets, side light brackets, and other supporting parts which are now generally furnished as constituents of standard automobile equipment. The device is readily removable thus giving ready access to the radiator for inspection or repair, and as it is not an integral part of the radiator, the heat of the latter is less likely to injure the paint or enamel of the front. Owing, also, to the one-piece construction of the front, the latter is prefectly rigid thus eliminating vibration and reducing danger of injury to the chassis. Furthermore, the device acts to protect the parts in the rear thereof against injury from shocks and weather conditions.

I claim:

1. A front for a motor car or motor lorry consisting of a one-piece body connected to the radiator and serving to support the headlight, side lamps, starting handle, identification plate, engine bonnet, closure screen and the like.

2. A front for a motor vehicle according to claim 1, an opening in said front for the passage of air to the radiator.

3. In a front for a motor vehicle according to claim 2, a movable closure screen within said body and sliding in front of the radiator.

In testimony whereof I have affixed my signature in presence of two witnesses.

ALEXANDRE LAMBLIN.

Witnesses:
 LOUIS GARDET,
 HENRI MONIN.